United States Patent [19]
Schoolar
[11] 3,716,424
[45] Feb. 13, 1973

[54] METHOD OF PREPARATION OF LEAD SULFIDE PN JUNCTION DIODES

[75] Inventor: Richard B. Schoolar, Silver Spring, Md.
[73] Assignee: The United States of America as represented by the Secretary of the Navy

[22] Filed: April 2, 1970
[21] Appl. No.: 24,983

[52] U.S. Cl. ..................148/175, 23/204, 117/106 R, 117/107, 117/200, 117/201, 136/89, 148/1.5, 252/62.3 E, 252/501, 252/518, 317/235 R
[51] Int. Cl. ..........H01l 7/00, B01j 17/00, G03g 5/02
[58] Field of Search ......148/1.5, 174, 175; 252/62.3, 252/501, 518; 23/204; 117/106, 201, 106 R, 107, 200; 136/89; 317/234, 235

[56] References Cited

UNITED STATES PATENTS

| | | | |
|---|---|---|---|
| 3,158,511 | 11/1964 | Robillard | 148/1.5 |
| 3,405,331 | 10/1968 | Skalski et al. | 317/235 |
| 3,500,137 | 3/1970 | Schroen et al | 317/235 |
| 3,512,017 | 5/1970 | Pierce et al | 317/234 X |
| 3,574,140 | 4/1971 | Schoolar et al | 252/501 |
| 3,403,133 | 9/1968 | Frederick et al | 252/62.3 E |

OTHER PUBLICATIONS

Schoolar et al. "Preparation of Single–Crystal Films of PbS" Journal of Applied Physics, Vol. 35, No. 6, June, 1964 pp 1,848–1,851.
Makino, Y. "PbTe Thin Film Prepared by Vacuum Evaporation on Mica" J. Phys. Soc. Japan 19 (1964) page 580.
BIS et al. "Alloy Films of $PbTe_x Se_{-x}$" Journal Applied Physics, Vol. 37, No. 1, January 1966, pp 228–230.
Egerton et al. "Epitaxial Films of PbTe, PbSe, and PbS Grown on Mica Substrates" Brit. J. Appl. Phys., 1967, Vol. 18, pp 1,009–1,011.

*Primary Examiner*—L. Dewayne Rutledge
*Assistant Examiner*—W. G. Saba
*Attorney*—R. S. Sciascia and J. A. Cooke

[57] ABSTRACT

Flat, uniform planar diodes of PbS are prepared by either (1) epitaxially growing an n-type layer onto a p-type layer by depositing one layer epitaxially onto the other in a vacuum of at least $5 \times 10^{-5}$ Torr wherein the substrate is at a temperature between 200–350° C and the material to be deposited is at a temperature not lower than its sublimation point or (2) epitaxially growing a p-type layer on an n-type layer using the procedure described in (1) with the addition of vapors of a doping agent such as S, Se or Te, in the system. This method may also be applied to the closely related compounds $Pb_xSn_{1-x}Se$ and $Pb_xSn_{1-x}Te$ where $x$ varies from 0 to 1 inclusive, hereinafter referred to as the lead-tin salt alloys.

6 Claims, 2 Drawing Figures

INVENTOR
Richard B. Schoolar

BY J. O. Tresansky
ATTORNEY

METHOD OF PREPARATION OF LEAD SULFIDE PN JUNCTION DIODES

BACKGROUND OF THE INVENTION

This invention generally relates to semiconductor junction diodes and more particularly to flat, uniform planar PbS diodes and to a method of preparation thereof.

It is well established that single crystal films of PbS and related compounds such as $Pb_xSn_{1-x}Se$ and $Pb_xSn_{1-x}Te$ where $x$ varies from 0 to 1 inclusive, hereinafter referred to as the lead-tin salt alloys, can be epitaxially grown on heated alkali halide substrates by vacuum evaporation. It is also known that the conductivity type of these semiconductors in bulk form can be controlled by controlling deviations from stoichemetry. Anion vacancies (lead and tin) make these crystals p-type and cation vacancies make them n-type.

PbS junction diodes have been made from bulk crystals and used as infrared light emitters and lasers. When a PbS diode of suitable quality is cooled to 77° K and is electronically pumped in the forward bias direction, it emits radiation near ≈4 microns. If the junction is prepared in a resonant cavity geometry and is pumped with sufficiently large current densities, laser action can be achieved. Diodes of the lead-tin salt alloys have also been made from bulk crystals and shown to be useful as infrared photovoltaic detectors and current injection lasers.

In the past planar diodes of the lead salts have been produced through the use of diffusion techniques but these compounds do not diffuse uniformly and flat uniform junctions are very difficult to obtain by this method. Alloying techniques have also been used but these have not met with appreciably more success than the diffusion techniques.

Bulk diffused junctions have been used as lasers and photovoltaic detectors but these are very difficult to produce and elaborate procedures are required to obtain products which can be used in multi-element arrays.

Furthermore, it is known that one must have a shallow junction diode in order to obtain photovoltaic cells with high quantum efficiencies. The prior art methods of diode crystal growth, however, have not easily produced shallow junctions and it has been extremely difficult to accurately regulate the junction depths in lead salt diodes.

Furthermore, spectral response of a photovoltaic cell is a function of junction depth with a shallow junction cell having a broad spectral response whereas a deep junction device has a narrow-band-pass response.

Until now, however, no method has been reported for controlling the stoichemetry and conductivity type of the epitaxial films.

SUMMARY OF THE INVENTION

Accordingly, one object of this invention is to provide flat, uniform planar junction PbS diodes.

Another object of this invention is to provide a method for the formation of epitaxial, flat, uniform planar diodes of PbS which method may also be used to prepare uniform diodes of the lead-tin salt alloys $Pb_xSn_{1-x}Se$, $Pb_xSn_{1-x}Te$ where x varies from 0 to 1 inclusive and mixtures thereof.

A further object of this invention is to provide a method for the growth of a p-type epitaxial layer of PbS, $Pb_xSn_{1-x}Te$ and $Pb_xSn_{1-x}Se$ onto an n-type substrate composed of PbS, $Pb_xSn_{1-x}Te$ or $Pb_xSn_{1-x}Se$.

A still further object of this invention is to provide a method which can be used to grow an n-type epitaxial layer of PbS, $Pb_xSn_{1-x}Te$ and $Pb_xSn_{1-x}Se$ onto a p-type layer of PbS, $Pb_xSn_{1-x}Te$ or $Pb_xSn_{1-x}Se$.

A further object of this invention is to provide pn junctions which can be used as photovoltaic cells in the infrared spectral region.

Another object of this invention is to provide planar diodes which can be used as current injection infrared emitters and lasers.

A still further object of this invention is to provide devices which can easily be made into multi-element arrays.

Another object of this invention is to provide a method of epitaxial growth which can easily be regulated to grow n- or p- type layers of controlled thicknesses which can yield photovoltaic cells with controlled band pass response.

A still further object of this invention is to provide a method of epitaxial growth at relatively low temperatures to produce abrupt p-n junctions.

These and other objects of this invention are accomplished by providing semiconductor diodes with planar pn junctions which are prepared by epitaxially growing p-type films onto n-type substrates in a vacuum containing a doping material as well as the material to be deposited and/or epitaxially growing n-type films onto p-type substrates in a vacuum without a doping material. Although this invention is applicable to the growth of PbS on $Pb_xSn_{1-x}Te$, PbS on $Pb_xSn_{1-x}Se$, $Pb_xSn_{1-x}Te$ on $Pb_xSn_{1-x}Se$, $Pb_xSn_{1-x}Te$ on PbS, $Pb_xSn_{1-x}Se$ on PbS, $Pb_xSn_{1-x}Se$ on $Pb_xSn_{1-x}Te$, PbS on PbS, $Pb_xSn_{1-x}Te$ on $Pb_xSn_{1-x}Te$ and $Pb_xSn_{1-x}Se$ on $Pb_xSn_{1-x}Se$ the preferred diodes of this invention are made of PbS on PbS.

BRIEF DESCRIPTION OF THE DRAWING

Other objects and many of the attendant advantages of the present invention will be readily appreciated as the same becomes better understood by reference to the following detailed description when considered in connection with the accompanying drawings.

DESCRIPTION OF THE PREFERRED EMBODIMENTS

Figure 1:
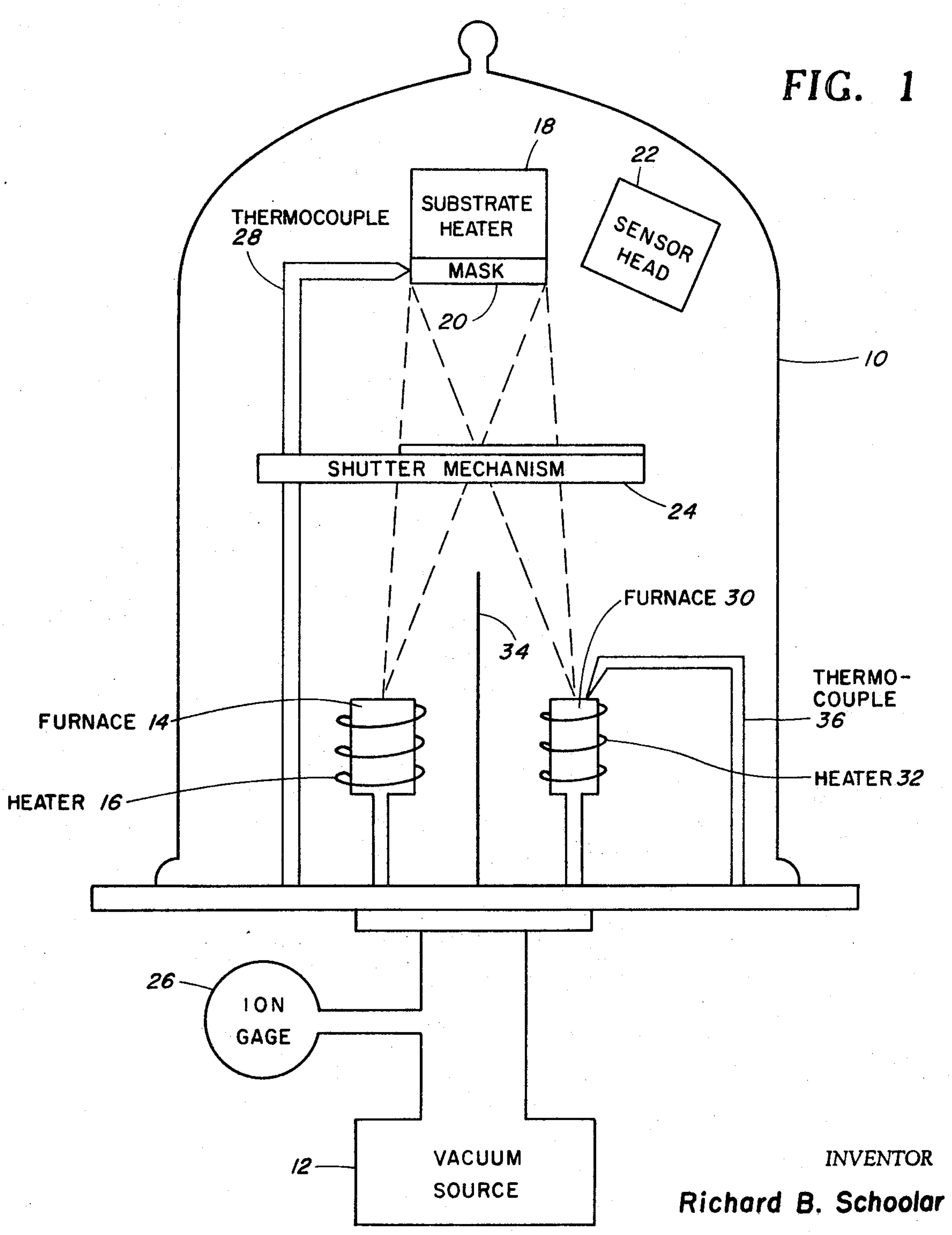
FIG. 1 is a schematic diagram of the evaporation apparatus in which the process of this invention is carried out.

Referring now in greater detail to FIG. 1 of the drawing the evaporation apparatus, in which the process of this invention is to be carried out, is shown as including a bell jar 10 connected to any standard vacuum source 12. Disposed within bell jar 10 is a first furnace 14, in which the material to be sublimed is placed and a heater coil 16, which may be made of nichrome or molybdenum, for heating the material. The substrate is placed in a substrate heater 18 which has a mask 20 interposed between the substrate and furnace 14. The film thickness is measured by a film thickness sensor head 22. A movable shutter mechanism 24 is interposed between mask 20 and furnace 14. An ion gage 26 is provided to measure the total pressure in the apparatus. Additionally, a thermocouple 28 is used to measure the temperature of the substrate. A furnace 30 is also disposed in the bell jar 10 to evaporate the p-type doping material when a p-type layer is being grown. Furnace 30 also has a heating coil 32 around it which may be made of nichrome or molybdenum. The nature of furnaces 14 and 30 is not limited to that disclosed herein but may also be a flash evaporation, induction heating or electron bombardment type furnace. A partition 34 is placed between the two furnaces to prevent interaction therebetween. A thermocouple 36 is included to determine the temperature of furnace 30.

When an epitaxially grown p-type layer is desired, the appropriate doping material is placed in furnace 30. In the case of lead sulfide, the doping material may be sulfur but many other materials which are known to be sources of sulfur may also be used as a p-type doping agent. Se or Te may also be used as the doping agents.

For p-type deposition, furnace 30 is heated by coil 32 to a temperature sufficiently high to produce an appreciable vapor pressure of the doping material at the surface of the substrate. The vapor pressure of the doping material at the substrate ($P_s$) is given by the equation $P_s = (P_f A/\pi_d 2)$ (1) where $P_f$ is the dopant vapor pressure inside the furnace, $A$ is the area of the furnace opening and $d$ is the distance from the furnace to the substrate.

The relationship between $P_f$ and the temperature of the furnace for the doping materials can be found in the literature. The magnitude of $P_s$ required to dope the deposited film p-type depends on the temperature of the substrate $T_s$.

Figure 2:
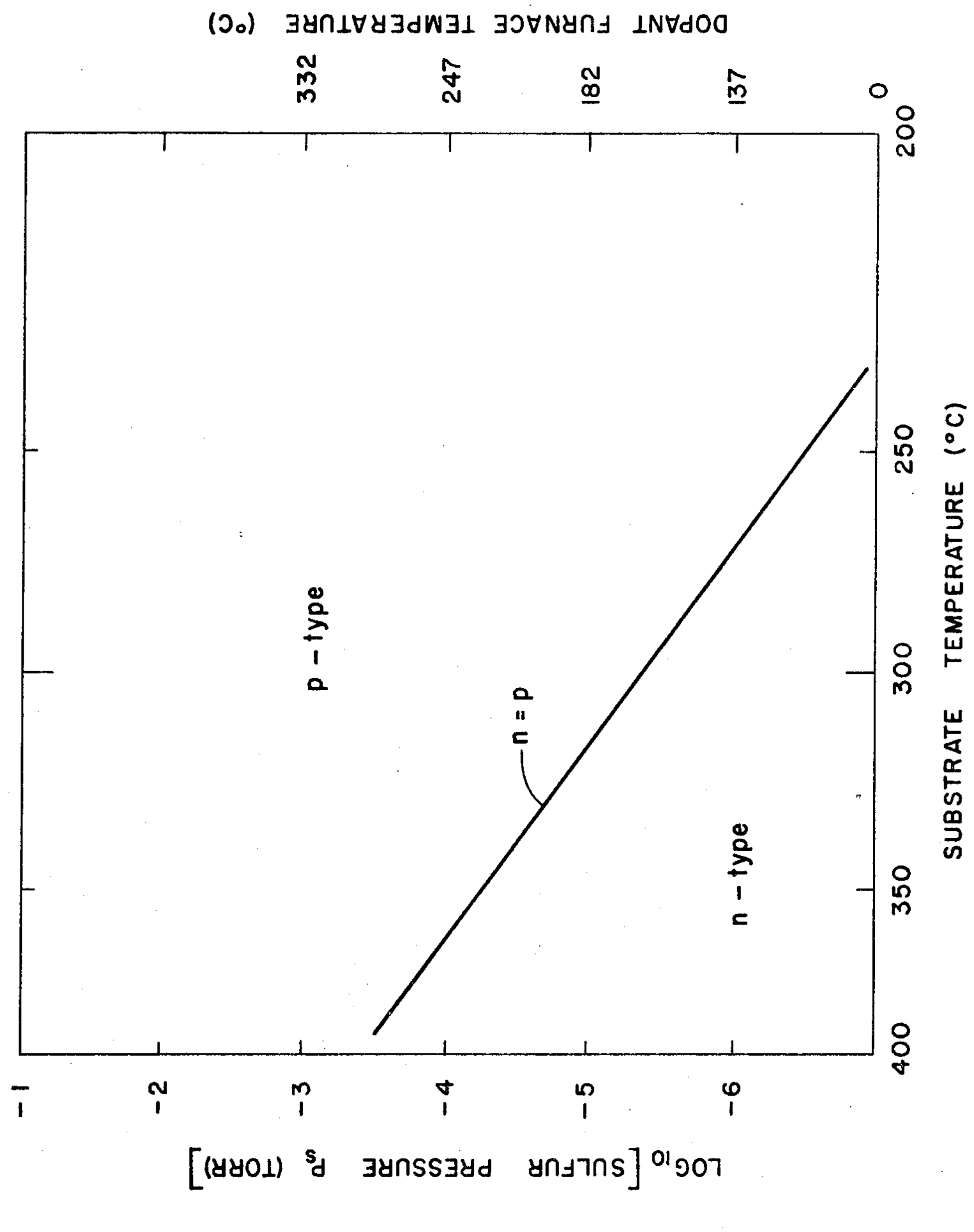
FIG. 2 is a phase diagram for PbS showing the composition as a function of substrate temperature and partial pressure of S or dopant furnace temperature.

FIG. 2 is a phase diagram for PbS shown as a function of substrate temperature and partial pressure of S on the left scale and dopant furnace temperature on the right scale. Thus, in the system of Example II hereinafter described, a dopant temperature of 137° C will yield a partial pressure of S of $10^{-6}$ Torr. The solid curve corresponds to stoichiometric PbS. In order to obtain p-type growth, conditions of deposition must be selected so that the composition is above the solid line. Thus, a substrate temperature and dopant furnace temperature must be selected such that the intersection of these two lines on the diagram of FIG. 2 falls above the solid line. To obtain n-type deposition, they must intersect below the solid line.

The lead salt or lead-tin salt alloy to be sublimed in furnace 14 onto the substrate is nearly the same as the composition of the film and is not merely a mixture of the elements but is derived from chemically reacted materials. It is preferable to use materials which are slightly rich in Pb, for PbS growth and rich in ($Pb_xSn_{1-x}$) for the lead-tin salt alloys growth so that one would obtain an n-type layer unless a doping material is used in furnace 30.

It is necessary to heat the substrate in order to obtain a single crystal epitaxial film since if it is not heated a polycrystalline film is obtained. For PbS, the optimum temperature for heating the substrate is about 270° C but one can efficiently operate in a temperature range of 200–350° C. The same range is also applicable to the epitaxial growth of lead-tin salt alloy films.

The rate of deposition depends on the temperature of furnace 14 which heats the material to be sublimed. The temperature of this furnace is not critical as long as the temperature is above the sublimation temperature of the material to be sublimed. As will be recognized by one skilled in the art the higher the temperature the greater the rate of sublimation and hence the greater the rate of growth. It is best to adjust the temperature to achieve the desired rate of growth and for PbS deposition at about 170 A/min was found to be optimum.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE I

An initial substrate n-type PbS crystal can be prepared according to the procedure outlined in "-Preparation of Single-Crystal Films on PbS" by Schoolar and Zemel, appearing in the Journal of Applied Physics, Volume 35, No. 6, 1,848–51, June 1964 and hereby incorporated by reference. This procedure will yield an n-type PbS single-crystal film on NaCl which can be used as a substrate for growth of a p-type PbS layer. Preferably, the n-type film is grown to a thickness of about 30 microns and the NaCl dissolved away prior to growth of the p-type layer.

EXAMPLE II

An n-type substrate, which can be either a bulk n-type crystal or a thick n-type film epitaxially grown on an NaCl substrate (described in Example I) is used as the substrate on which a p-type layer of PbS is to be grown. If a bulk crystal is used the surface to be grown on should be chemically or thermally polished prior to growth of the epitaxial layer. If a thick film is used the NaCl substrate is dissolved away prior to placement in the substrate holder. It is necessary to remove the NaCl to avoid reticulation of the film when it is heated to grow the p-type layer. A sulfur doping agent, a sulfur pellet of about 2 gms, is placed in furnace 30. PbS slightly rich in Pb is placed into furnace 14. The entire system is then evacuated to a pressure of about $10^{-}$Torr. (A pressure no higher than $5 \times 10^{-5}$ Torr should be used) and the shutter is placed between the furnaces and the substrate so that they may be outgassed without appreciable interaction. When down to pressure the substrate heater is turned on and allowed to come to a steady state temperature near 270° C and furnaces 14 and 30 are heated. P-type films are grown with dopant furnace 30 $\geq$ 130°C since the distance from the furnace to the substrate is 7 cm and the furnace opening is $1.8 \times 10^{-3}$ cm$^2$ in agreement with Eq. 1 and the data in FIG. 2. The temperature of the material to be sublimed is about 700° C. When all the heaters are at the proper temperatures the shutter is removed and deposition is carried out. The average deposition rate is about 170 A/min. A p-type epitaxial layer of the desired thickness is grown on the n-type PbS substrate. At the end of the deposition period the shutter 24 is closed and the substrate is allowed to cool to room temperature.

The sulfur pellet provides sufficient partial pressure to dope the epitaxial layer p-type whereas the substrate remains n-type. The interface between the film and substrate is a flat, uniform, single-crystal pn junction.

Junction diodes are then prepared by cleaving the film-covered substrates into the desired shape and attaching electrical leads to the n- and p-type layers. PbS diodes prepared in this manner have been demonstrated to be infrared light emitters and detectors. Photovoltaic detectors prepared this way have a narrow-band-pass response if the thickness of the window layer in greater than ≈3 microns.

Similarly, an n-type PbS film can be grown on p-type substrates or an n-type film can be grown on an NaCl crystal if the doping material in the hereinbefore described procedure is omitted. Likewise, a p-type film can be grown on an NaCl crystal if a doping agent is included. The same general techniques may be used to prepare planar diodes of $Pb_xSn_{1-x}Se$, and $Pb_xSn_{1-x}Te$. All of these materials have energy gaps <0.4eV and can be used as light emitters and detectors throughout the infrared spectral region. A selenium or tellurium source, such as elemental Se or Te, must be heated to provide sufficient background pressure to dope the p-type epitaxial film and this is accomplished merely by placing the source in furnace 30 and heating it to the required temperature. When n-type deposition is desired one merely omits the use of the doping agent. Otherwise, all the procedures are the same.

Additionally, more complex structures can be prepared using this method. For example, an npn phototransistor can be prepared by growing a p-type epitaxial layer on an n-type substrate and then growing an n-type layer over the p-type layer. Using the dual furnace technique herein described such combinations can be grown without having to break the vacuum of the system merely by controlling the temperature of furnace 30. When n-type growth is wanted one merely omits heating furnace 30 and when p-type growth is desired one merely closes the shutter, heats furnace 30 to the correct temperature and thereafter opens the shutter to obtain the desired growth.

Furthermore, it is possible to dope PbS with Te or Se and conversely to dope $Pb_xSn_{1-x}Te$ with S or Se and to dope $Pb_xSn_{1-x}Se$ with S or Te. The instant procedure is also applicable to this type of doping since all that is required is the use of a different doping material in furnace 30.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method of epitaxially growing an n-type layer of a material selected from the group consisting of PbS, $Pb_xSn_{1-x}Se$ and $Pb_xSn_{1-x}Te$ wherein $x$ varies from 0 to 1 inclusive onto a p-type substrate of a material selected from the group consisting of PbS, $Pb_xSn_{1-x}Se$ and $Pb_xSn_{1-x}Te$ wherein x varies from 0 to 1 inclusive comprising:
   depositing said n-type layer at a pressure no greater than $5 \times 10^{-5}$ Torr from a source of the material to be deposited said source material being the chemically reacted materials having about the same composition as that of the films to be deposited but being slightly rich in $(Pb_xSn_{1-x})$, said source material being at a temperature at least equal to the sublimation temperature of that material onto a p-type substrate which is at a temperature between 200–350°C.

2. A method of epitaxially growing a p-type layer of a material selected from the group consisting of PbS, $Pb_xSn_{1-x}Se$ and $Pb_xSn_{1-x}Te$ wherein varies from 0 to 1 inclusive onto an n-type substrate of a material selected from the group consisting of PbS, $Pb_xSn_{1-x}$ Se and $Pb_xSn_{1-x}Te$ wherein x varies from 0 to 1 comprising:
   depositing said p-type layer at a pressure no greater than $5 \times 10^{-5}$ Torr from a source of the material to be deposited, said source material being the chemically reacted materials having about the same composition as that of the films to be deposited but being slightly rich in $(Pb_xSn_{1-x})$, said source material being at a temperature at least equal to the sublimation temperature of that material, onto an n-type substrate at a temperature between 200–350°C in the present of vapors of a substance capable of altering the stoichiometry of said film,
   said vapors being selected from the group consisting of S, Te and Se.

3. A method according to claim 1 wherein the substrate and the material to be deposited is PbS.

4. A method according to claim 3 wherein the temperature of the substrate is about 270°C, the rate of deposition is about 170 A/min. and the pressure is about $10^{-5}$ Torr.

5. A method according to claim 2 wherein the substrate and the material to be deposited is PbS.

6. A method according to claim 5 wherein the temperature of the substrate is about 270°C, the rate of deposition is about 170 A/min. and the pressure is about $10^{-5}$ Torr.

* * * * *